United States Patent [19]

Hanai

[11] 4,101,938
[45] Jul. 18, 1978

[54] APPARATUS FOR REPRODUCING HIGH FIDELITY MAGNETIC TAPES FROM A MASTER TAPE

[75] Inventor: Ichiro Hanai, Tokyo, Japan

[73] Assignee: Sony Corporation, Tokyo, Japan

[21] Appl. No.: 440,263

[22] Filed: Feb. 6, 1974

[30] Foreign Application Priority Data

Feb. 9, 1973 [JP] Japan .............................. 48-17437[U]

[51] Int. Cl.² .......................... G11B 5/86; G11B 15/43
[52] U.S. Cl. ......................................... 360/16; 360/71
[58] Field of Search ....................... 360/16, 69, 70, 71, 360/73, 91, 15, 17

[56] References Cited

U.S. PATENT DOCUMENTS

| 3,777,075 | 12/1973 | Hendershot III, et al. | 360/17 |
| 3,825,948 | 7/1974 | Hendershot III, et al. | 360/16 |
| 3,827,077 | 7/1974 | Kobilka | 360/16 |

FOREIGN PATENT DOCUMENTS 960,772  6/1964  United Kingdom ................... 360/70

*Primary Examiner*—Raymond F. Cardillo

*Attorney, Agent, or Firm*—Hill, Gross, Simpson, Van Santen, Steadman, Chiara & Simpson

[57] ABSTRACT

A copying machine for reproducing magnetic video tapes wherein the copies are brought into contact with a master tape, upon which is recorded original video information and with the copy or slave tape being heated at a temperature in the vicinity of the Curie point such that the recorded information on the master tape will be printed on the slave or copy tape. Since the copy or slave tape will shrink after the heating, the present invention provides for compensation of the shrinkage of the slave or copy tape by expanding the master tape in a direction and manner so as to provide that the information on the slave tape will be accurate after it has cooled down.

An oscillator is connected to two recording heads spaced a fixed distance apart which record two signals on the master tape before it has been heated and two reproducing heads are mounted the same fixed distance apart as the recording heads adjacent the slave tape after it has cooled and a comparator detects any phase difference and controls the tape speed.

2 Claims, 6 Drawing Figures

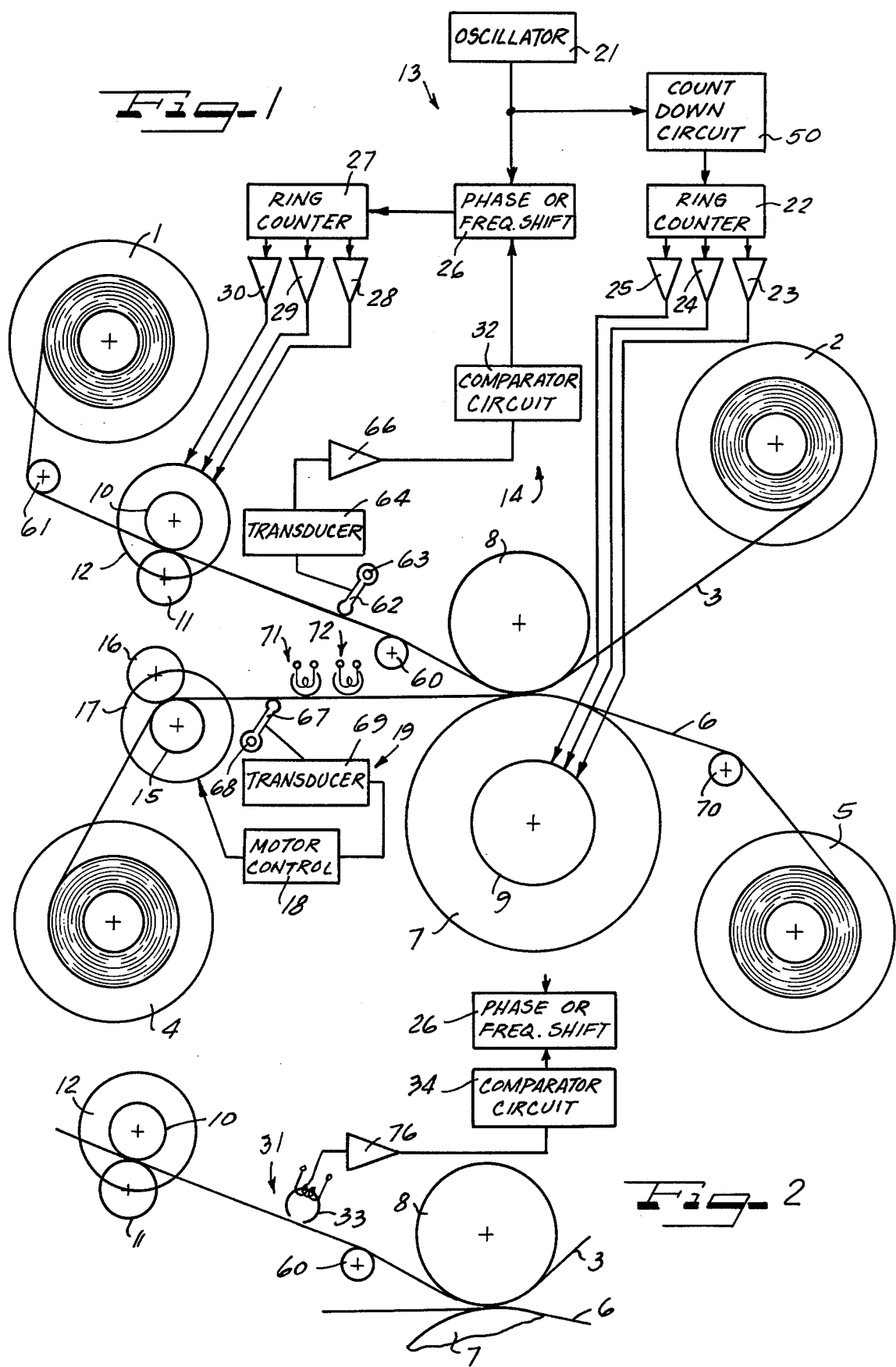

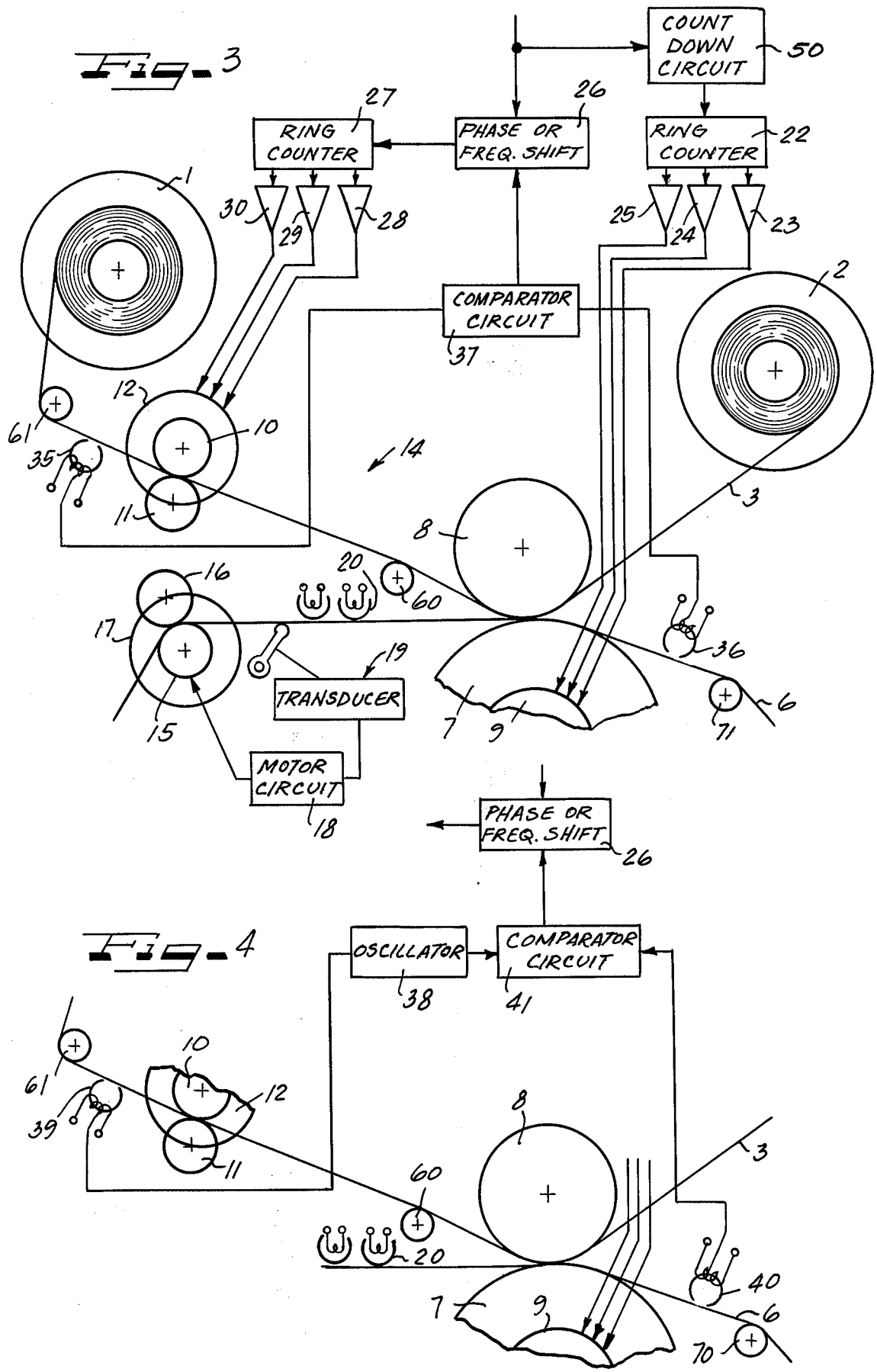

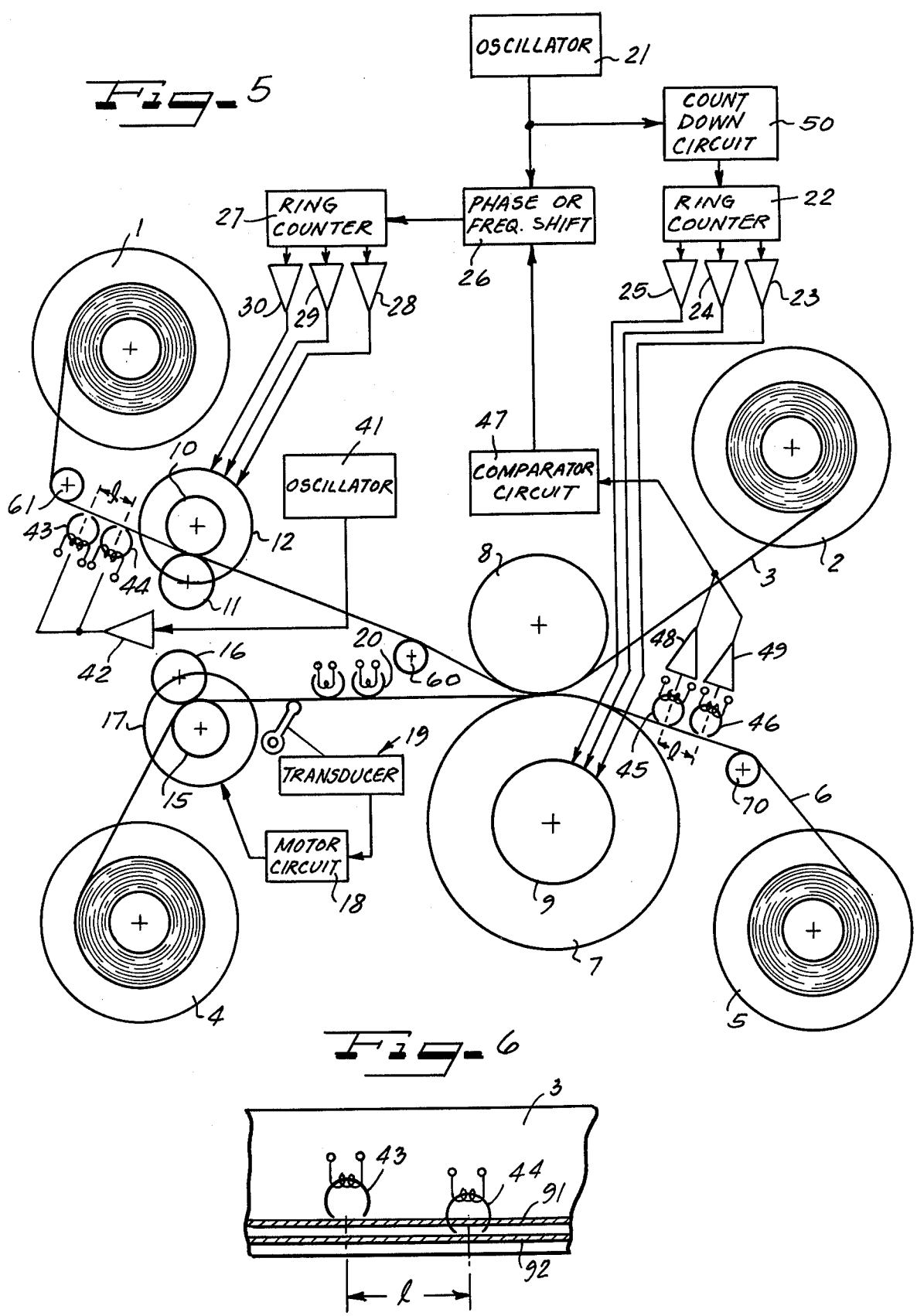

APPARATUS FOR REPRODUCING HIGH FIDELITY MAGNETIC TAPES FROM A MASTER TAPE

BACKGROUND OF THE INVENTION

1. Field of the Invention

This invention relates in general to thermal printing apparatus for producing a copy or slave magnetic tape by bringing the slave tape into contact with a master tape so that the information on the master tape will be printed on the slave tape. The slave tape is heated to a temperature in the vicinity of the Curie point and the present invention relates to an improved printing apparatus wherein the stretch or shrinkage due to the temperature changes do not result in distortion in the information printed on the completed slave tape.

2. Description of the Prior Art

It is known in the prior art to transfer information recorded on a magnetic storage tape to a slave tape by bringing the slave and master tape into contact with each other and wherein the slave tape medium is heated to a temperature high enough to reduce the reluctivity so that accurate copying occurs.

The slave storage medium is made of materials such as chromium dioxide $CrO_2$ which have a relatively low Curie point $T_c$. Such material also has desirable characteristics in the thermal printing art. The material such as chromium dioxide has a constant reluctivity at temperatures lower than the Curie point but the reluctivity suddenly drops near the Curie point $T_c$.

On the other hand, the master magnetic storage medium is made of materials such as gamma ferric oxide ($\gamma$-$Fe_2O_3$) or Fe-Co alloy, and these materials have a gradually sloping remnance characteristic that covers a large temperature range below the Curie point $T_c'$ ($T_c << T_c'$).

When copy or slave magnetic storage material $CrO_2$ is heated to a temperature which is equal to or higher than the Curie point $T_c$ and is then brought into direct contact with the master magnetic storage medium, information recorded on the master magnetic storage medium will be directly transferred to the copy or slave magnetic storage medium.

Conventional slave or copy magnetic tape is formed of polyester resin film as a base which generally has the characteristic in that it shrinks during cooling after being heated. For this reason, if the pattern of the information on the master tape is printed on the slave tape without compensating the pattern on the slave tape would not be a direct copy of the original pattern on the master tape due to the shrinking characteristic of the copy or slave tape.

SUMMARY OF THE INVENTION

In the present invention shrinkage of the slave or copy tape due to cooling after being heated is compensated by expanding the pattern which is printed on the slave tape by an amount so as to compensate for the shrinkage as the slave tape cools. This is accomplished by expanding the pattern of the intelligence on the master tape before bringing it into contact with the slave tape and then after shrinkage of the slave tape, the pattern copied will be the desired one.

The main object of the present invention is to provide thermal printing apparatus for producing a slave or copy tape in which the information on the slave tape after shrinkage is the accurate, desired undistorted information.

Another object of this invention is obtained by providing means for expanding the master tape by a controlled amount so as to obtain a copy or slave tape which has high fidelity.

Yet another object of this invention is to provide in a thermal printing apparatus which expands the master tape in response to an independent.

Yet another object of this invention comprises providing in a thermal printing apparatus means for detecting the amount of shrinkage of the slave tape and controlling the amount of expansion of the master tape an amount corresponding to such shrinkage.

Still another object of the invention is to provide thermal printing apparatus which controls the tension on a master tape as a function of the shrinkage of a slave tape.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which:

BRIEF DESCRIPTION OF THE DRAWINGS

FIG. 1 is a schematic side view of a thermal printing apparatus according to the invention;

FIG. 2 illustrates a modification of the tape tensioning detector of the present invention;

FIG. 3 is a schematic view of the thermal printing apparatus of the invention;

FIG. 4 is a schematic view of a modified form of the control apparatus of the invention;

FIG. 5 is a schematic view of a preferred embodiment of the invention; and

FIG. 6 is a plan view of a master tape with two reference signal tracks shown thereon.

DESCRIPTION OF THE PREFERRED EMBODIMENTS

FIG. 1 illustrates a master tape 3 which contains information which is to be transferred to a copy or slave tape 6. The master tape 3 is mounted on a pay-out reel 1 and passes over a guide pin 61 and between a pinch roller 11 and capstan 10. The capstan 10 is driven by a motor 12 whose speed can be controlled, as will be described hereafter. The tape then passes a tension detecting lever arm 62 which is pivotally supported at the end away from the tape by a pivot pin 63 and is mechanically connected to an electrical signal output device 64 which might, for example, be a slide potentiometer controlled by the position of the arm 62 so as to produce a voltage output indicative of the position of the arm 62 which indicates the tension of the tape 3 between the capstan and pinch roller 10 and 11 and a pair of printing rollers 7 and 8. A guide pin 60 is mounted between the tension detector 62 and the rollers 7 and 8 and engages the surface of the tape 3.

The tape 3 passes from the rollers 7 and 8 to a take-up reel 2 which is driven by a suitable drive means so as to take up the tape after it has passed between the rollers 7 and 8.

The copy or slave tape is indicated by numeral 6 and passes from a pay-out reel 4 between a pinch roll 16 and a capstan 15 which is driven by a motor 15. The slave tape 6 then passes a tension detector 19 comprising a feeler arm 67 which engages the surface of the tape 6 to detect its tension and which is supported on a pivot pin 68. A transducer 69 converts the movement of the pivot arm 67 into an electrical signal which provides an output signal to a motor control 18 which controls the speed of the motor 17 so as to maintain the tension on the tape 6 constant at the point where the tension detector 19 engages the tape.

The tape 6 is heated by a pair of heaters 71 and 72 which heats it to the vicinity or higher than the Curie point $T_c$ so that printing can occur between the master tape 3 and the slave tape 6. The slave tape 6 then passes between the rollers 7 and 8 and makes intimate contact with the master tape 3 and printing of the intelligence from the master tape 3 occurs at this point. The tape 6 then passes over a guide pin 70 to a take-up reel 5 which is driven by a suitable drive means so as to drive the reel 5.

The rollers 7 and 8 provide sufficient pressure on the tapes 3 and 6 so that intimate contact is made between the tapes and also prevents mutual slippage between the two tapes. The roller 7 serves to cool the tape 6 after it has made contact with the master tape 3. A variable speed drive motor 9 drives the roller 7 and roller 8 is an idle roller.

The copy or slave tape 6 shrinks between the pick-up reel 5 and the printing point between the rollers 7 and 8 and for this reason, the master tape 3 is stretched in the region between the rollers 7 and 8 and the rollers 10 and 11. This stretching of the master tape causes the intelligence to be printed on the hot slave tape, such that when the slave tape shrinks the intelligence on the slave tape will be undistorted.

The motor 17 drives the capstan 15 such that the tension on the tape 6 is constant between the rollers 7 and 8 and the rollers 16 and 15.

The motor 17 is driven by the output signal from the motor control 18 which produces an output that varies as a function of the tension as detected by the tension detector 19. Thus, the motor 17 maintains the tension fixed at a desired value.

The motors 9 and 12 are hysteresis synchronous motors which operate on the basis of hysteresis losses induced in the hardened steel secondary member by the revolving field of the primary. The output of the oscillator 21 is supplied to a count-down circuit 50 which reduces the frequency of the oscillator 21 and supplies an output at the reduced frequency to a ring counter 22 which provides three outputs respectively to amplifiers 23, 24 and 25 which are connected to drive the motor 9. The motor 12 is driven from a signal from the tension detector 31 which is generated by the transducer 64 in response to movement of the tension feeler arm 62 and supplies an output to an amplifier 66. The amplifier 66 supplies output to the comparator circuit 32 and this comparator compares the output of the amplifier 66 with a reference voltage that has been preset so as to produce an output error signal for controlling the phase or frequency shift of the phase or frequency shift circuit 26. The phase or frequency shift circuit 26 supplies an output to a ring counter 27 which provides three outputs to amplifiers 28, 29 and 30 connected to the motor 12 to control its speed.

The amount of shrinkage of the slave tape 6 can be determined by experimentation and thus is known. Also, the tension required on the master tape 3 to stretch it a predetermined amount can also be predetermined by experimentation.

Since the amount of stretch of the tape 3 between the rollers 7 and 8 and 10 and 11 must be equal to the amount of shrinkage of the tape 6 during cooling, the tension required in the tape 3 between these rollers is known and can be set by adjustment of the output of the circuit 32, so that the motors 9 and 12 have speeds such that the desired tension is obtained for obtaining the desired amount of stretch.

FIG. 2 illustrates a modification of the invention, wherein the tension detector comprises a magnetic head 33 is mounted so as to contact the master tape 3 between the roller 7 and capstan 10 and reproduces a control signal to control the speed of the motor 12. The master tape 3 will carry a control signal which is detectable by the magnetic head 33 and the speed at which the tape 3 passes the magnetic head 33 indicates the speed of the tape at that point. The output of the magnetic head 33 is passed to the amplifier 76 which gives an output to a comparison circuit 34 which supplies an input to the phase or frequency shift circuit 26. All of the other components in the embodiment of FIG. 2 except the detector means 33, 76 and 34, are the same as those illustrated in FIG. 1.

The reference signal detected by the magnetic head 33 determines and indicates the amount of expansion of the master tape 3 between the rollers 10 and 7 and the intervals of the control signal on the master tape are expanded corresponding to the tension and expansion of the tape. For example, when the tape is unexpanded, a 60 Hz signal for the control signal would be impressed on the video tape. The thermal print apparatus of the invention transports the tape by the rollers 7 and 8 at a speed which is 50 times that of the conventional video tape recorder speed, and if the shrinkage value of the slave tape 6 is assumed to be 0.3%, then the required expansion of the master tape 3 would be 0.3%. Under these conditions and with the assumed values given above, the frequency detected by the magnetic head 33 must be $(60 \times 50 \times 1/1.003)$ Hz or 2,991.02 Hz. In other words, when the frequency detected by the head 33 in the embodiment illustrated in FIG. 2 is at this frequency, the proper amount of expansion or stretch exists in the tape 3 for printing.

It will be realized, of course, that the reference signal can also be predetermined in advance corresponding to the desired shrink percentage of the slave tape.

FIG. 3 illustrates a third embodiment of the invention, and particularly of the detector 14.

In this embodiment, a first magnetic head 35 is in contact with the master tape between the capstan 10 and the drive pin 61 and a second magnetic head 36 is in contact with the slave tape 6 between the roller 7 and the pin 70. A comparator 37 such as a phase or frequency comparator receives the outputs of heads 35 and 36 and produces an output signal if there is any difference in phase or frequency between the two input signals from the heads 35 and 36. The output signal of comparator 37 is supplied to the phase or frequency shift circuit 26 so as to control the speed of the motor 12 to maintain the desired stretch in the tape 3.

If it be assumed that the speed of the tape at the contact point between rollers 7 and 8 is V meters per second, and that the shrinkage due to cooling is $\alpha\%$, then the tape speed at the contact point of the head 36 should be $V \times (1 - \alpha)$ meters per second. The same speed should exist in the tape 3 at the point between capstan 10 and guide roller 61, and this will result in a condition that the master tape 3 will be transported in the stretched or expanded condition at α% between the rollers 7 and capstan 10.

With this embodiment, exact matching of the reproduced signals with the signals on the master tape, will be printed on the slave tape.

Another embodiment of the invention is illustrated in FIG. 4, wherein the detector 14 consists of an oscillator 38 which is connected to a magnetic writing head 39 so as to record the reference signal on the tape 3. This embodiment would be useful wherein the master tape 3 does not carry a pre-recorded reference signal, for example. The recording head 39 is mounted between the guide pin 61 and capstan 10. A reproducing head 40 is mounted in contact with the slave tape 6 after it has passed between the rollers 7 and 8. A comparator circuit 41 receives the output of head 40 and an input from oscillator 38 and supplies an error signal to the phase or frequency shift circuit 26 if there is any difference between the output of the oscillator 38 and the detected signal from the head 40. It will be realized, of course, that in the embodiments illustrated in FIGS. 3 and 4, that the heads 36 and 40 are placed such that shrinkage of the slave tape 6 has occurred at the positions where the heads 36 and 40 are mounted.

The embodiment illustrated in FIG. 5 utilizes a detector comprising an oscillator 41 which produces a reference signal and supplies an input to a pair of recording heads 43 and 44 through an amplifier 42. The recording heads 43 and 44 are in contact with the master tape 3 between the guide pin 61 and the capstan 10 and are spaced longitudinally relative to the tape 3 at a distance "1". The heads 43 and 44 are also spaced transversely to each other so that they record a pair of tracks 91 and 92 on the tape 3 as illustrated in FIG. 6.

A pair of reproducing heads 45 and 46 are mounted so as to be in contact with the slave tape 6 between the roll 7 and the guide pin 70. The heads 45 and 46 are spaced the same distance "1" as the spacing between the recording heads 43 and 44 and are aligned so as to read the signals from the two separate tracks which have been transferred from the tape 3 to the tape 6. A comparator circuit 47 receives the outputs of heads 45 and 46 through the amplifiers 48 and 49 and produces an error signal to control the phase of frequency shift circuit 26 and thus the speed of the motor 12 in the event any phase or frequency error exists.

When the intelligence transferred to tape 6 is accurate, and is an exact copy of the intelligence on the unexpanded tape 3, the signals 45 and 46 will be at the same frequency and in phase as are the signals applied to heads 43 and 44. This is because the heads 43 and 44 and heads 45 and 46 are spaced apart at the same distance and after shrinkage, the detected control signals at heads 45 and 46 should be in phase.

It will be realized that the pattern of the information on the master tape can be recorded in an expanded condition, which has been expanded by any percentage value with the use of a cylindrical drum having several rotating heads therein for recording signals.

Such cylindrical drum may be of the type used in conventional video tape recorders. The rate of expansion value of the pattern of information recorded on the master tape will vary as the rate of increase of the diameter of the cylindrical drum.

When the master tape carries information which has been expanded at a rate of α%, the interval between the heads 43 and 44 must be increased by the same percentage of the prior distance "1" by α%. Another modification can be made wherein the signal to the head 44 is delayed by a fixed percent relative to the spacing mentioned above.

With this structure, the control device can control the tension according to the small change of rate of the previously mentioned shrinkage of the slave tape 6 independently of the change in tape speed. In other words, the shrinkage value of the slave tape is known in advance as previously mentioned, but this value may not be correct at any particular time because the shrinkage is influenced by many elements, as for example, the temperature of the room, etc. Thus, in the invention, the reference signal will be accurately reproduced even though there are variations in room temperature and other influencing factors.

It is seen that this invention provides a new and novel method and apparatus for accurately recording information from a master to a slave tape, and although it has been described with respect to the preferred embodiments, it is not to be so limited as changes and modifications may be made which are within the full intended scope as defined by the appended claims.

I claim as my invention:

1. A thermal printing apparatus comprising, a master tape driving means, a slave tape driving means, a pair of driven rollers contacting said master tape with said slave tape, heating means for heating said slave tape before it contacts said master tape, a motor control means connected to said master tape driving means, a first pair of magnetic heads mounted adjacent said master tape and spaced longitudinally a predetermined distance for recording the same signal on separate channels on said master tape before it reaches said master tape driving means, a second pair of magnetic heads mounted adjacent said slave tape after it has passed said rollers and has shrunk and spaced longitudinally said predetermined distance for reading signals from separate channels printed on said slave tape, a comparator circuit receiving the outputs of said second pair of magnetic heads and supplying a signal to said motor control means to control the tension on said master tape between said master tape driving means and said pair of rollers.

2. In a thermal printing apparatus according to claim 1 a tension device sensing the tension of said slave tape between said slave tape driving means and said rollers and supplying a signal to control said slave tape driving means.

* * * * *